Patented Mar. 26, 1935

1,995,776

UNITED STATES PATENT OFFICE 1,995,776

THERAPEUTIC COMPOSITION

Ferdinand W. Nitardy, Brooklyn, N. Y., Walter G. Christiansen, Bloomfield, N. J., and John Lewis Deuble, Brooklyn, N. Y., assignors to E. R. Squibb & Sons, New York, N. Y., a corporation of New York No Drawing. Application July 22, 1931, Serial No. 552,552

8 Claims. (Cl. 167—58)

Our invention relates to oleaginous compositions that shall serve as vehicles for, and/or shall constitute, therapeutic preparations. By "therapeutic" herein we mean permanently or temporarily alleviating, rectifying, curing, or preventing bodily diseases, disorders, or deficiencies, by whatever mode of action.

Numerous medicines are, of necessity or for convenience, administered in oil media. Heretofore such preparations have failed to attain their potential efficacy, owing to the inability of the oil to spread quickly and extensively on aqueous surfaces. In order to act upon the mucous membranes, for example, a remedial agent applied to them must pass into their watery lining, and the speed and thoroughness with which the active substance is transferred to the aqueous phase varies directly as the capacity of the oil for spreading on water.

It is the object of our invention to provide oleaginous therapeutic compositions characterized by the power to spread efficiently—that is, both rapidly and widely—upon aqueous surfaces.

We have found that oleaginous compositions suitable for efficacious therapeutic administration may be prepared by dissolving in oily materials an interface-tension depressant comprising an oil-soluble sub-emulsifier the molecule of which includes at least one group tending to confer water-solubility, the term "sub-emulsifier" herein meaning any substance capable of effecting the unstable dispersion of oils in water and/or any substance capable of, but not present in sufficient proportion for, effecting the stable dispersion of oils in water. Additional substances having the desired pharmacological action may be truly or colloidally dissolved in, or otherwise incorporated into, the oily material. Of course, either the oily material or the interface-tension depressant, or both, may possess medicinal virtues, and thus constitute complete medicaments in themselves, or cooperate therapeutically with the curative or propylactic agents.

Oily materials that we may employ embrace generally oils proper, and fats, greases, and waxes liquid at body temperature, of animal, vegetable, mineral, or synthetic origin. For example, liquid petrolatum is conspicuously adapted to our uses.

Among the groups whose presence in the molecule of our interface-tension depressant confers a tendency to water-solubility are those having the general formulas $SO_3X$, $COOX$, $OX$, and $PO_3X_2$, wherein X represents hydrogen, an alkali metal, an equivalent of an alkaline-earth metal, ammonium, or substituted ammonium.

Our preferred interface-tension depressants include compounds having the general formula $XSO_3RCOOY$, wherein X represents hydrogen, an alkali metal, ammonium, or substituted ammonium, R represents an alkylene before sulphonation, and Y represents hydrogen, an alkali metal, an equivalent of an alkaline-earth metal, ammonium, substituted ammonium, or

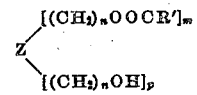

Especially favored are: sulphonated oleic acid and derivatives thereof in which either or both the carboxyl and the sulphonic-acid group are salified with an alkali metal, ammonium, or triethanolamine; and sulphonated olein and its alkali-metal, ammonium, and substituted ammonium salts.

Another available class (overlapping that described in the foregoing paragraph) comprises the partial esters of compounds in which alkanol groups are linked together through nitrogen, oxygen, or sulphur, in accordance with the general formula:

$$Z\begin{cases}[(CH_2)_nOOCR']_m \\ [(CH_2)_nOH]_p\end{cases}$$

wherein Z represents nitrogen, oxygen, or sulphur, R' represents an aliphatic radical, $n$ represents 2, 3, 4, or 5, $m$ represents 1 or 2, and $p$ represents 1 or 2. Specific examples in this class are the mono-lauryl and the mono-oleyl esters of triethanolamine and the mono-laurate of $\beta\beta'$ dihydroxy ethyl ether:

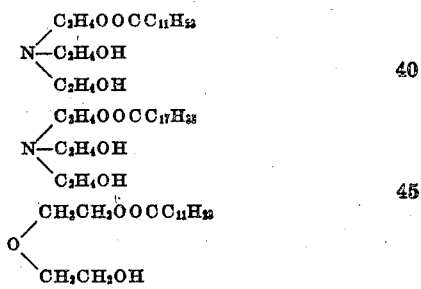

Other compounds suitable as interface-tension depressants are mono- and di- esters of glycerin, and mono- (for example, mono-oleyl) esters of glycol.

Our interface-tension depressant is required in so small a proportion that it does not impart objectionable taste or other sense reaction to, or unfavorably affect the pharmacological properties of, the composition. Of course, a larger amount of it may be necessary if it is to function simultaneously as a therapeutic agent.

An example of the compositions made in accordance with our invention is an internal lubricant comprising liquid petrolatum to which has been added one-tenth percent of sulphonated olein. This preparation, which answers all the specifications for liquid petrolatum, is signally superior thereto in that the former spreads over more than seven hundred times as great an area as an equal mass of the latter and is comparatively free from the latter's very disagreeable tendency to intestinal leakage.

Further examples are: (as an oil spray for application to the nose and throat) a one-half-percent solution of ephedrin or (as a germicidal surgical oil dressing) a one-half-percent solution of 5-chloro 8-hydroxy quinolin, in liquid petrolatum to which has been added one-twentieth percent of oleyl triethanolamine or one-tenth percent of the ammonium salt of sulphonated olein.

As still further examples, the following are adduced:

Vitaminous dietary supplement: 1 liter of cod-liver oil containing in solution 1 gram of sulphonated olein.

Rectal suppository: chlorbutanol, 15 grains; cacao butter, 30 grains; and mono-lauryl ester of triethanolamine, ⅛ grain.

Germicidal ointment: 2-hydroxy 5-normal-propyl diphenyl, 1 gram; petroleum jelly melting at 95° F., 98.7 grams; and sulphonated olein, .3 gram.

Catarrh jelly: menthol, 1.25 grams; eucalyptol, 2.50 grams; chlorbutanol, 1.00 gram; white petrolatum. 95 grams; and mono-laurate of $\beta\beta'$ di-hydroxy ethyl ether, .25 gram.

Germicidal gynecological lubricant: 5-chloro 8-hydroxy quinolin, .5 gram; olive oil, 99.3 grams; and sulphonated olein, .2 gram.

It will be understood that the foregoing embodiments are merely illustrative and by no means limitative of our invention, which may assume various other forms—for instance, as to the particular interface-tension depressants and oily materials used and their specific proportions, and the nature of the ultimate preparations—within the scope of the appended claims.

We claim:

1. In a therapeutic composition, an oily material containing in solution a sub-emulsifying proportion of the ammonium salt of sulphonated olein.

2. In a therapeutic composition, an oily material containing a sub-emulsifying proportion of sulphonated olein in solution.

3. In a therapeutic composition, an oily material containing a sub-emulsifying proportion of oleyl triethanolamine in solution.

4. In a therapeutic composition, liquid petrolatum containing in solution a sub-emulsifying proportion of the ammonium salt of sulphonated olein.

5. In a therapeutic composition, liquid petrolatum containing a sub-emulsifying proportion of sulphonated olein in solution.

6. In a therapeutic composition, liquid petrolatum containing a sub-emulsifying proportion of oleyl triethanolamine in solution.

7. In a therapeutic composition, an oily material containing in solution a sub-emulsifying proportion of a substance selected from the group consisting of sulphonated olein, the ammonium salt of sulphonated olein, and oleyl triethanolamine.

8. In a therapeutic composition, liquid petrolatum containing in solution a sub-emulsifying proportion of a substance selected from the group consisting of sulphonated olein, the ammonium salt of sulphonated olein, and oleyl triethanolamine.

FERDINAND W. NITARDY.
WALTER G. CHRISTIANSEN.
J. LEWIS DEUBLE.